US012763544B2

(12) United States Patent
Halama

(10) Patent No.: US 12,763,544 B2
(45) Date of Patent: Oct. 13, 2026

(54) MODE-MATCHING A PLURALITY OF OPTICAL BEAMS TO A CORRESPONDING PLURALITY OF OPTICAL POWER AMPLIFIERS

(71) Applicant: Rosemount Aerospace Inc., Burnsville, MN (US)

(72) Inventor: Gary E. Halama, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 339 days.

(21) Appl. No.: 18/394,319

(22) Filed: Dec. 22, 2023

(65) Prior Publication Data

US 2025/0210931 A1 Jun. 26, 2025

(51) Int. Cl.
*H01S 3/1109* (2023.01)
*G01N 21/25* (2006.01)
(Continued)

(52) U.S. Cl.
CPC .......... *H01S 3/1109* (2013.01); *G01N 21/255* (2013.01); *G01N 21/538* (2013.01);
(Continued)

(58) Field of Classification Search
CPC ............. H01S 3/06758; H01S 3/06754; H01S 3/0092; H01S 3/005; H01S 3/094003; H01S 3/0064; H01S 3/2308; H01S 3/2316; H01S 3/0057; H01S 3/06708; H01S 3/10015; H01S 3/0078; H01S 5/50; H01S 3/06704;
(Continued)

(56) References Cited

U.S. PATENT DOCUMENTS 5,059,917 A * 10/1991 Stephens ............... H01S 5/4025 359/347
5,313,263 A * 5/1994 Abbiss ...................... G01P 5/26 356/28

(Continued)

FOREIGN PATENT DOCUMENTS

CN 106451055 A * 2/2017 ......... H01S 3/10053
CN 106451055 B * 12/2018 ......... H01S 3/10053
(Continued)

OTHER PUBLICATIONS

Extended European Search Report dated May 7, 2025, for corresponding European Patent Application No. 24218451.3, 9 pgs.

*Primary Examiner* — Michael P Stafira
(74) *Attorney, Agent, or Firm* — Kinney & Lange, P.A.

(57) ABSTRACT

Apparatus and associated methods relate to mode matching a plurality of optical beams to a corresponding plurality of optical power amplifiers. The mode-matched plurality of beams is generated by mode matching a single laser beam and then splitting the mode-matched beam into the plurality of beam-split portions. Each of the plurality of beam-split portions is then guided to a corresponding one of a plurality of optical power amplifiers that amplifies the beam-split portion guided thereto. Optical path lengths between the mode-matching optics and the plurality of optical power amplifiers are created to be substantially equal to one another thereby enabling optical mode matching of the mode-matched optical beam to each of the plurality of optical power amplifiers.

14 Claims, 4 Drawing Sheets

(51) Int. Cl.
*G01N 21/53* (2006.01)
*H01S 3/00* (2006.01)
*H01S 3/10* (2006.01)
*H01S 3/23* (2006.01)
*G01N 21/39* (2006.01)

(52) U.S. Cl.
CPC .......... *H01S 3/0071* (2013.01); *H01S 3/0085* (2013.01); *H01S 3/10015* (2013.01); *H01S 3/10023* (2013.01); *H01S 3/10092* (2013.01); *H01S 3/2308* (2013.01); *G01N 2021/392* (2013.01); *G01N 2201/06113* (2013.01)

(58) Field of Classification Search
CPC .. H01S 3/06729; H01S 3/109; H01S 3/06741; H01S 3/094007; H01S 3/113; H01S 5/026; H01S 3/1001; H01S 5/4025; H01S 3/06791; H01S 3/13013; H01S 3/0675; H01S 5/06256; H01S 5/1064; H01S 5/146; H01S 3/2383; H01S 5/0655; H01S 3/06745; H01S 3/1305; H01S 3/2333; H01S 5/1014; H01S 5/141; H01S 3/067; H01S 3/10092; H01S 5/1215; H01S 5/125; H01S 5/187; H01S 5/2036; H01S 5/4087; H01S 3/06716; H01S 3/10038; H01S 3/10046; H01S 3/2375; H01S 5/20; H01S 3/0818; H01S 3/10076; H01S 5/0286; H01S 5/06216; H01S 5/0625; H01S 5/1003; H01S 5/1082; H01S 5/1085; H01S 5/14; H01S 5/2063; H01S 5/4062; H01S 2301/03; H01S 3/0014; H01S 3/108; H01S 3/2391; H01S 5/0428; H01S 5/10; H01S 3/10084; H01S 3/1666; H01S 3/1673; H01S 5/02355; H01S 5/02365; H01S 2301/166; H01S 3/0085; H01S 3/094053; H01S 3/0941; H01S 3/10023; H01S 3/115; H01S 3/1608; H01S 5/04256; H01S 5/065; H01S 5/185; H01S 3/06712; H01S 3/06725; H01S 3/0809; H01S 3/1106; H01S 3/1112; H01S 3/2341; H01S 3/0071; H01S 3/061; H01S 3/09415; H01S 3/1603; H01S 3/1623; H01S 3/163; H01S 2301/04; H01S 3/06787; H01S 3/094011; H01S 3/10007; H01S 3/1022; H01S 3/127; H01S 3/302; H01S 5/005; H01S 3/06783; H01S 5/5036; H01S 2301/02; H01S 3/107; H01S 3/1618; H01S 3/2325; H01S 5/02423; H01S 5/06258; H01S 5/4031; H01S 3/094061; H01S 3/094076; H01S 3/105; H01S 3/1053; H01S 3/1055; H01S 3/1611; H01S 5/0085; H01S 3/00; H01S 3/0604; H01S 3/0627; H01S 3/08027; H01S 3/09408; H01S 3/10; H01S 3/1109; H01S 3/1312; H01S 3/1616; H01S 5/0071; H01S 5/0265; H01S 5/0268; H01S 5/106; H01S 5/22; H01S 5/222; H01S 5/2231; H01S 5/227; H01S 5/2272; H01S 5/2275; H01S 5/4012; H01S 3/08013; H01S 3/094042; H01S 3/094069; H01S 3/094092; H01S 3/1003; H01S 3/10053; H01S 3/10061; H01S 3/13; H01S 3/1306; H01S 3/136; H01S 5/00; H01S 5/0092; H01S 5/022; H01S 5/4068; H01S 2301/08; H01S 3/0346; H01S 3/08; H01S 3/08009; H01S 3/08054; H01S 3/080872; H01S 3/081; H01S 3/0816; H01S 3/091; H01S 3/0912; H01S 3/1115; H01S 3/1118; H01S 3/137; H01S 3/225; H01S 5/0014; H01S 5/0057; H01S 5/0064; H01S 5/062; H01S 5/06223; H01S 5/12; H01S 5/5027; G02B 6/02347; G02B 6/02328; G02B 6/02376; G02B 6/02385; G02B 6/3826; G02B 6/3853; G02B 6/12004; G02B 6/305; G02B 6/2817; G02B 6/3512; G02B 6/3514; G02B 6/3548; G02B 6/357; G02B 2006/0098; G02B 6/02052; G02B 6/02366; G02B 6/02371; G02B 6/32; G02B 6/3504; G02B 6/4249; G02B 26/10; G02B 27/09; G02B 27/1006; G02B 27/108; G02B 27/1086; G02B 27/123; G02B 27/144; G02B 27/145; G02B 6/272; G02B 6/2766; G02B 17/008; G02B 17/0663; G02B 26/06; G02B 27/0068; G02B 6/00; G02B 6/4296; G02B 2006/12147; G02B 2006/12195; G02B 21/0012; G02B 27/286; G02B 6/12007; G02B 6/122; G02B 6/1228; G02B 6/13; G02B 6/2773; G02B 6/2813; G02B 6/2835; G02B 6/4207; G02B 6/4215; G02B 6/4287; G02B 6/4291; G02B 7/00; G02B 1/02; G02B 2006/1215; G02B 21/0056; G02B 21/0068; G02B 26/001; G02B 27/0916; G02B 27/095; G02B 6/03605; G02B 6/03633; G02B 6/03638; G02B 6/12; G02B 6/125; G02B 6/29361; G02B 6/29383; G02B 6/29395; G02B 6/4204; G02B 6/43; G02B 1/11; G02B 27/10; G02B 27/106; G02B 27/4227; G02B 5/04; G02B 5/12; G02B 5/1828; G02B 6/2931; G01N 21/65; G01N 21/658; G01N 21/39; G01N 2021/396; G01N 2201/06113; G01N 2021/392; G01N 21/01; G01N 21/255; G01N 21/31; G01N 21/4795; G01N 21/538; G01N 2021/1787; G01N 21/35; G01N 2201/08; G01J 3/10; G01J 11/00; G01J 1/10; G01J 3/0224; G01J 3/0245; G01J 3/108; G01J 3/42; G01J 3/433; G01J 3/447; G01J 1/0238; G01J 1/0242; G01J 3/28; G01J 3/45
See application file for complete search history.

(56) References Cited

U.S. PATENT DOCUMENTS

| | | | | |
|---|---|---|---|---|
| 7,106,447 | B2 * | 9/2006 | Hays | G01P 5/26 356/519 |
| 7,286,209 | B1 * | 10/2007 | Hopwood | G01S 7/4815 356/28 |
| 7,502,395 | B2 * | 3/2009 | Cheng | H01S 3/2383 356/477 |
| 10,042,119 | B2 | 8/2018 | Van Gorsel et al. | |
| 10,811,837 | B2 * | 10/2020 | Goodno | H01S 3/10084 |
| 10,886,696 | B2 | 1/2021 | Daniels | |
| 11,545,815 | B1 * | 1/2023 | Lentine | H01S 3/0078 |
| 2003/0063884 | A1 | 4/2003 | Smith et al. | |
| 2004/0151428 | A1 | 8/2004 | Nikonov | |
| 2005/0248748 | A1 * | 11/2005 | Caldwell | G01P 5/26 356/28 |

(56) References Cited

U.S. PATENT DOCUMENTS

| | | | | |
|---|---|---|---|---|
| 2006/0171018 A1* | 8/2006 | Galvanauskas | ......... | H01S 3/115 359/333 |
| 2006/0171429 A1* | 8/2006 | Seitel | .................... | H01S 3/1083 372/10 |
| 2007/0248136 A1* | 10/2007 | Leonardo | ........... | B23K 26/0676 372/55 |
| 2025/0015563 A1* | 1/2025 | Campbell | ............. | H01S 5/0268 |

FOREIGN PATENT DOCUMENTS

| | | | | | |
|---|---|---|---|---|---|
| CN | 113394653 A | * | 9/2021 | ............... | H01S 3/23 |
| CN | 114006248 A | * | 2/2022 | ............. | H01S 3/081 |
| CN | 114779277 A | | 7/2022 | | |
| CN | 115685141 A | | 2/2023 | | |
| CN | 114006248 B | * | 5/2023 | ............. | H01S 3/081 |
| FI | 119209 B | * | 8/2008 | ............... | H01S 5/00 |
| FR | 3092442 A1 | * | 8/2020 | ........... | H01S 3/0092 |
| WO | WO-0233792 A2 | * | 4/2002 | ............. | H01S 3/063 |

* cited by examiner

MODE-MATCHING A PLURALITY OF OPTICAL BEAMS TO A CORRESPONDING PLURALITY OF OPTICAL POWER AMPLIFIERS

BACKGROUND

Some aircraft are equipped with laser air-data systems for optically measuring metrics of an atmosphere outside the aircraft. Such laser air-data systems typically project three or more beams of light, each typically a monochromatic beam of light, into the atmosphere. A reflected portion of each of the projected beams of light is then backscattered by aerosols (small particles that are suspended in the atmosphere, such as for example, dust, ash, water droplets, ice crystals, etc.), as well as by air molecules (e.g., $N_2$, $O_2$, $CO_2$, etc.) in the atmosphere. A wavelength spectrum (or frequency spectrum) of the reflected portion can be different from that of the projected beam. For example, the reflected portion can have a much broader wavelength spectrum than that of the projected beam of light, which, for a projected monochromatic beam of light, is of a very narrow wavelength spectrum. Moreover, amplitude variations within the spectrum of the reflected portion can arise. Such a wavelength spectrum of the reflected beam arises from the relative motions of the aircraft (or the laser air-data system) with respect to the backscattering aerosols in the atmosphere and with respect to the backscattering air molecules of the atmosphere. Such relative motions cause Doppler wavelength shifting (and corresponding Doppler frequency shifting) of photons reflected by aerosols and air molecules that are moving relative to the aircraft. Therefore, such relative motions of the aircraft with respect to the aerosols and/or air molecules, as well as other metrics of the atmosphere, can be determined from the wavelength spectrum of the reflected portion. Projecting three or more beams of light in directions that span three-dimensional space permits determination of airspeed of the aircraft in three dimensions (i.e., airspeed, angle of attack, and angle of sideslip).

Although both aerosols and air molecules backscatter the projected beam of light, such backscattering is predominantly a result of different scattering mechanisms for aerosols versus air molecules. The size of the objects, from which the light is backscattered, determines which scattering mechanism predominates. For example, for air molecules, Rayleigh scattering typically predominates. For aerosols, which are much larger than air molecules, Mie scattering typically predominates. Not only does the predominant scattering mechanisms differ for backscattering by aerosols versus backscattering by air molecules, but the wavelength spectrum of light backscattered by aerosols is also different than the wavelength spectrum of light backscattered by air molecules.

Such differences arise because of differences in distributions of relative motions of aerosol populations and air-molecule populations. Because aerosols are large in comparison to the air molecules, aerosols have a motion that is commensurate with whatever air currents are present in the atmosphere in which the aerosols are suspended. The air current can be thought of as an average of the motions of the air molecules. Aerosols all drift together with the air currents at low relative velocities with respect to one another. Thus, the wavelength spectrum of light reflected by aerosols is narrow, almost identical in width to the narrow wavelength spectrum of the projected beam of light. Although such a width of the wavelength spectrum is like that of the wavelength spectrum of the projected beam of light, the actual wavelength that characterizes the wavelength spectrum of light backscattered by aerosols (e.g., a mean wavelength or some other characterizing central wavelength of the wavelength spectrum) can be different from the wavelength that characterizes the wavelength spectrum of the projected beam of light. Such a difference between these two characteristic wavelengths is indicative of the relative motion of the aircraft with respect to the air currents present in the atmosphere in which the backscattering aerosols are suspended. These differences correspond to the relative airspeeds of the aircraft in the directions of the reflected portions backscattered by aerosols.

Because air molecules in the atmosphere are much smaller than the average distance between these air molecules, air molecules travel large distances (relative to their tiny sizes) between collisions with other air molecules. Such collisions between pairs of air molecules are largely elastic in nature. Although the average velocity of air molecules can be characterized by the velocity of the air current, the population of air molecules typically have a broad distribution of velocities about such an average velocity. This broad distribution results from the large velocities of the air molecules in random directions between collisions. These large velocities of air molecules can greatly exceed the magnitude of the velocity of the air currents. The kinetic theory of gases characterizes and quantifies such constant (between collisions), rapid, and random motions of air molecules. The root-mean-square (RMS) average of air molecules has been shown to be:

$$v_{RMS} = \sqrt{\frac{3k_B T}{m}}, \tag{1}$$

where $k_B$ is Boltzmann's constant, T is the temperature of the air, and m is the mass of each air molecule. For air molecules, such RMS average velocities are very high—much higher than typical airspeeds of flying aircraft. Not only is the RMS average velocity of air molecules very high, but the standard deviation of the velocities of air molecules is also very high. Such high standard deviations result in broadening of the wavelength spectrum of light backscattered by air molecules.

FIG. 1 is a graph depicting wavelength spectra of a monochromatic projected beam of light and light backscattered by aerosols and air molecules. In FIG. 1, graph 2 includes horizontal axis 4, vertical axis 6 and wavelength spectra $\mathbf{8}_{PROJ}$, $\mathbf{8}_{AERO}$ and $\mathbf{8}_{MOL}$. Horizontal axis 4 is indicative of wavelength, and vertical axis 6 is indicative of amplitude. Projected-beam wavelength spectrum $\mathbf{8}_{PROJ}$ corresponds to the projected beam of light. Projected-beam wavelength spectrum $\mathbf{8}_{PROJ}$ has a characterizing central wavelength of $\bar{\lambda}_{PROJ}$. Projected-beam wavelength spectrum $\mathbf{8}_{PROJ}$ has a characteristic breadth (e.g., full-width at half-maximum amplitude) of $\bar{\lambda}_{PROJ}$. Aerosol-backscattered wavelength spectrum $\mathbf{8}_{AERO}$ corresponds to the light backscattered by aerosols in the atmosphere outside the aircraft. Aerosol-backscattered wavelength spectrum $\mathbf{8}_{AERO}$ has a characterizing central wavelength of $\bar{\lambda}_{AERO}$. Aerosol-backscattered wavelength spectrum $\mathbf{8}_{AERO}$ has a characteristic breadth of αλAERO. Molecule-backscattered wavelength spectrum $\mathbf{8}_{MOL}$ corresponds to the light backscattered by air molecules of the atmosphere outside the aircraft. Molecule-backscattered wavelength spectrum $\mathbf{8}_{MOL}$ has a characterizing central wavelength of $\bar{\lambda}_{MOL}$. Molecule-backscattered wavelength spectrum $\mathbf{8}_{MOL}$ has a characteristic breadth of ΔλMOL. Although depicted as separate spectra (i.e., aerosol-backscattered wavelength spectrum $\mathbf{8}_{AERO}$ and molecule-backscattered wavelength spectrum $\mathbf{8}_{MOL}$), the spectrum of the reflected portion will be a combination (i.e., a sum) of wavelength spectrum $\mathbf{8}_{AERO}$ and wavelength spectrum $\mathbf{8}_{MOL}$. The sum of aerosol-backscattered wavelength spectrum $\mathbf{8}_{AERO}$ and molecule-backscattered wavelength spectrum $\mathbf{8}_{MOL}$ can be referred to as a Doppler-shifted wavelength spectrum of the reflected portion.

Note that the characterizing central wavelength $\bar{\lambda}_{AERO}$ of light backscattered by aerosols is identical to the characterizing central wavelength $\bar{\lambda}_{MOL}$ of light backscattered by the air molecules. This is because the RMS average velocity of air molecules is equal to the air current. Therefore, the RMS average Doppler shift due to molecular backscattering is equal to the average Doppler shift due to aerosol backscattering. Note also that both characterizing central wavelengths $\bar{\lambda}_{AERO}$ and $\bar{\lambda}_{MOL}$ of light backscattered by aerosols and air molecules are not equal to the characterizing central wavelength $\bar{\lambda}_{PROJ}$ of the projected beam of light. This difference in the characterizing central wavelengths between $\bar{\lambda}_{PROJ}$ and either of $\bar{\lambda}_{AERO}$ or $\bar{\lambda}_{MOL}$ is indicative of the airspeed of the aircraft with respect to the air current of the atmosphere outside the aircraft. Finally, note the similarities and differences in the shapes and breadths $\Delta\lambda_{PROJ}$, $\Delta\lambda_{AERO}$, and $\Delta\lambda_{MOL}$ of the spectra $\bar{\lambda}_{PROJ}$, $\mathbf{8}_{AERO}$ and $\mathbf{8}_{MOL}$, respectively. The specific shapes and breadths $\Delta\lambda_{PROJ}$, $\lambda_{AERO}$, and $\Delta\lambda_{MOL}$ of these spectra $\mathbf{8}_{PROJ}$, $\mathbf{8}_{AERO}$ and $\mathbf{8}_{MOL}$ are indicative of various metrics of the atmosphere, such as, for example, static air temperature, static air pressure, airspeed, as well as metrics of particles in the atmosphere. Such metrics can then be communicated to the pilot, crew and/or aircraft management system(s) of the aircraft so as to be used to control the flight of the aircraft.

Because these air-data systems are used to determine air-speed of the aircraft in three dimensions, a light box must generate at least three beams of light and direct the three beams it generates in three directions that spans three-dimensional space. Because three or more beams are generated in such light boxes, these light boxes can require many optical elements, which can involve many calibrations. Therefore, it could be helpful to have light box architectures that are more elegantly simple in both design and calibration.

SUMMARY

Apparatus and associated methods relate to a system for measuring metrics of an atmosphere. The system includes a laser configured to generate a laser beam. The system includes mode-matching optics configured to receive the laser beam generated by the laser and to generate a mode-matched optical beam therefrom. The system includes a plurality of beam splitters configured to split the mode-matched optical beam into a plurality of beam-split portions, each substantially equal in amplitude with others of the plurality of beam-split portions. The system includes a plurality of optical power amplifiers, each configured to receive and amplify a corresponding one of the plurality of beam-split portions, thereby generating a corresponding one of the plurality of amplified beams. Optical path lengths between the mode-matching optics and the plurality of optical power amplifiers are substantially equal to one another, thereby enabling optical mode matching of the mode-matched optical beam to each of the plurality of optical power amplifiers. The system includes a plurality of optical projectors configured to project a plurality of projected beams into an atmosphere. Each of the plurality of optical projectors is configured to project a corresponding one of the plurality of amplified beams thereby projecting a corresponding one of the plurality of projected beams. The system includes a plurality of optical receivers configured to receive a plurality of received beam-split portions of the plurality of projected beams backscattered by the atmosphere. Each of the plurality of optical receivers is aligned so as to receive a corresponding one of the plurality of received beam-split portions of the plurality of projected beams backscattered by the atmosphere. The system also includes an air-data calculator configured to calculate metrics of air data based on the plurality of received beam-split portions.

Some embodiments relate to a system for optical mode matching a plurality of optical beams to a corresponding plurality of optical power amplifiers. The system includes a laser configured to generate a laser beam. The system includes mode-matching optics configured to receive the laser beam generated by the laser and to generate a mode-matched optical beam therefrom. The system includes a plurality of beam splitters configured to split the mode-matched optical beam into a plurality of beam-split portions, each substantially equal in amplitude with others of the plurality of beam-split portions. The system includes a plurality of optical power amplifiers, each configured to receive and amplify a corresponding one of the plurality of beam-split portions, thereby generating a corresponding one of the plurality of amplified beams. Optical path lengths between the mode-matching optics and the plurality of optical power amplifiers are substantially equal to one another, thereby enabling optical mode matching of the mode-matched optical beam to each of the plurality of optical power amplifiers.

Some embodiments relate to a method for optical mode matching a plurality of optical beams to a corresponding plurality of optical power amplifiers. The system includes generating, via a laser, a laser beam. The method includes generating, via mode-matching optics, a mode-matched optical beam from the laser beam. The method includes splitting, via a plurality of beam splitters, the mode-matched optical beam into a plurality of beam-split portions. The method includes amplifying, via each of a plurality of optical power amplifiers, a corresponding one of the plurality of beam-split portions of the mode-matched optical beam. The method also includes configuring the plurality of splitters and the plurality of optical power amplifiers so as to make substantially equal to one another optical path lengths between the mode-matching optics and the plurality of optical power amplifiers, thereby enabling optical mode matching of the mode-matched optical beam to each of the plurality of optical power amplifiers.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate to mode matching a plurality of optical beams to a corresponding plurality of optical power amplifiers. The mode-matched plurality of beams is generated by mode matching a single laser beam and then splitting the mode-matched beam into the plurality of beam-split portions. Each of the plurality of beam-split portions is then guided to a corresponding one of a plurality of optical power amplifiers that amplifies the beam-split portion guided thereto. Optical path lengths between the mode-matching optics and the plurality of optical power amplifiers are created to be substantially equal to one another thereby enabling optical mode matching of the mode-matched optical beam to each of the plurality of optical power amplifiers.

Figure 1:
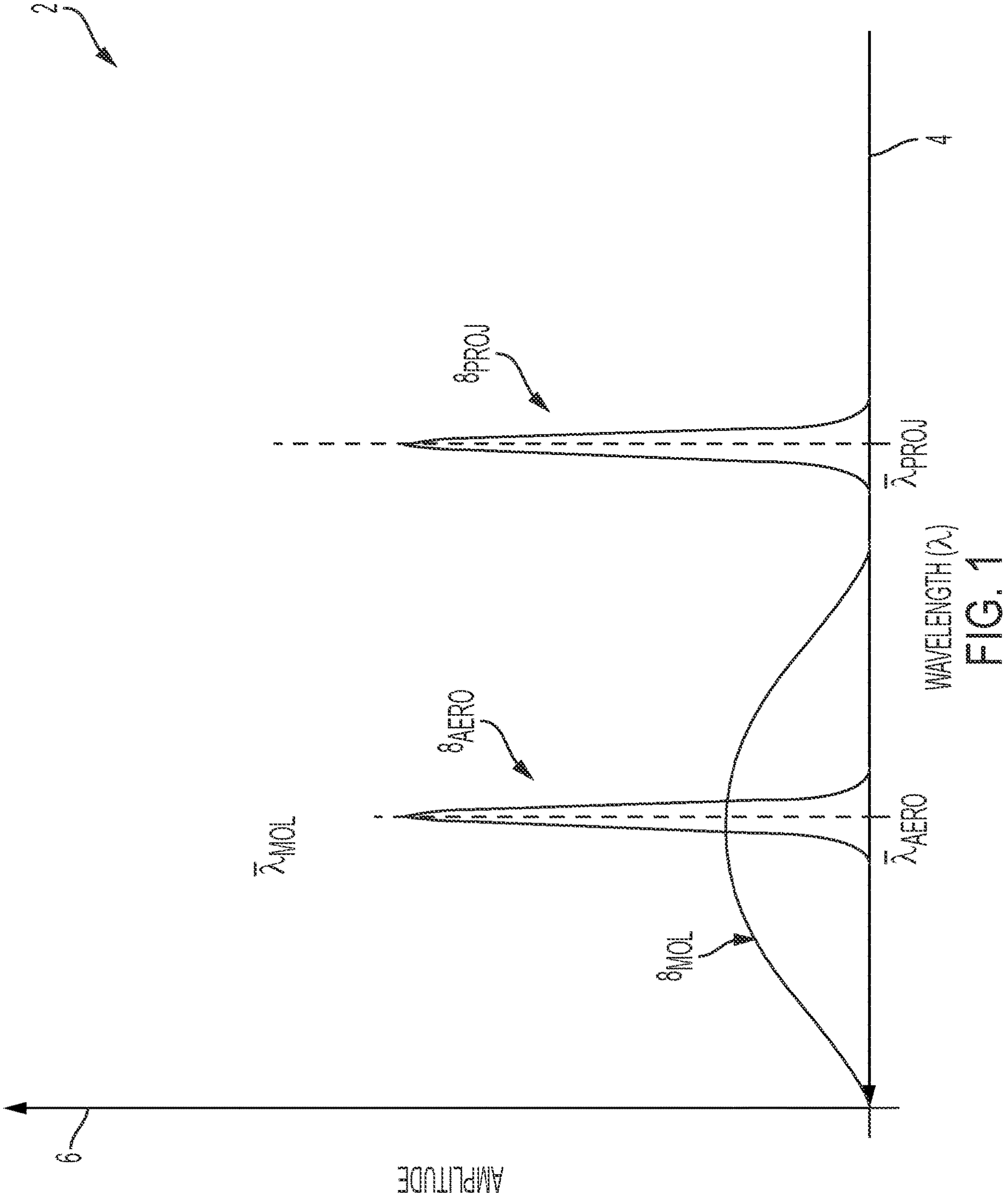
FIG. 1 is a graph depicting wavelength spectra of a monochromatic projected beam of light and light backscattered by aerosols and air molecules.
Figure 2:
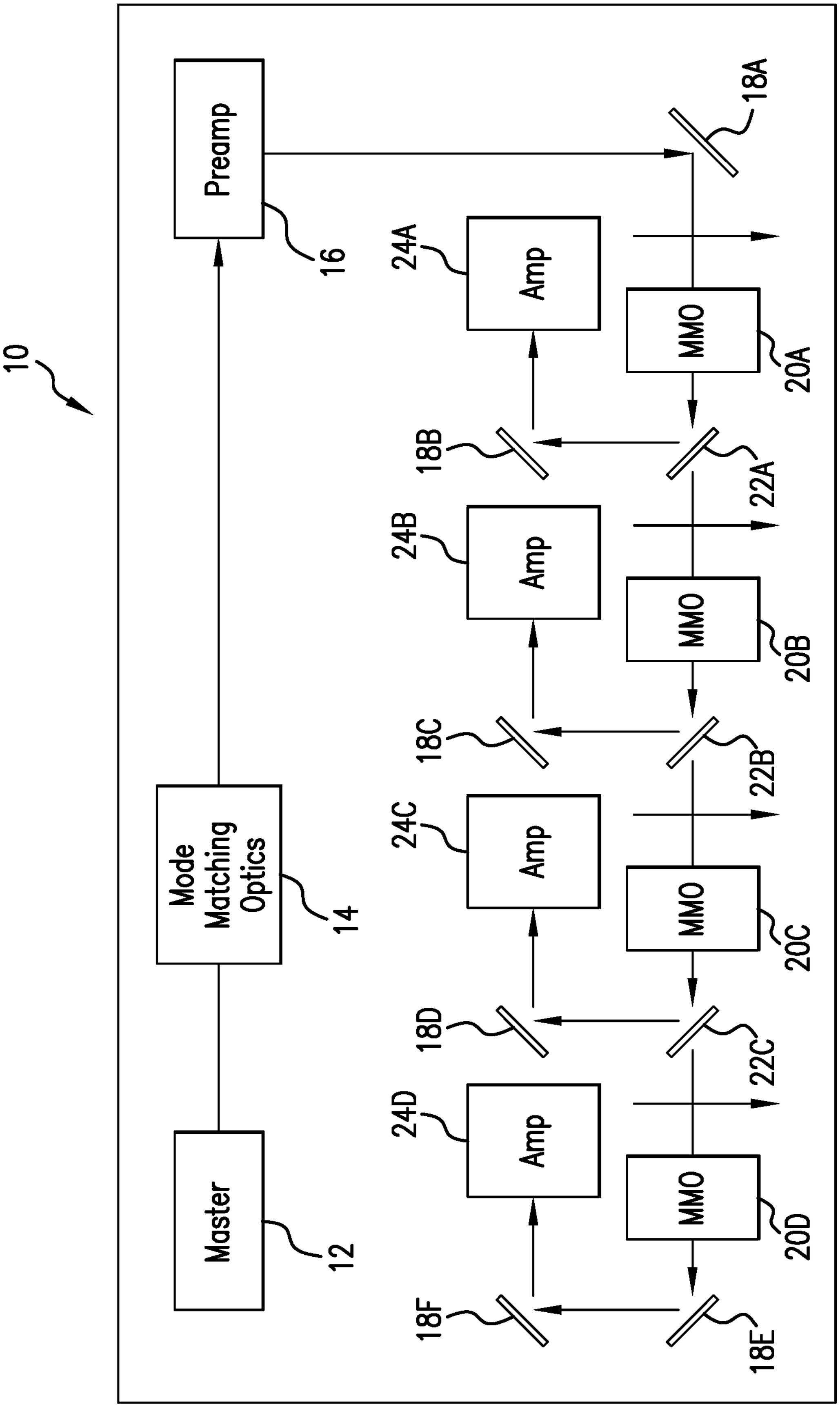
FIG. 2 is a schematic diagram of a laser air-data system's lightbox, which uses different mode-matching optics for each of its four channels.

FIG. 2 is a schematic diagram of a laser air-data system's lightbox, which uses different mode-matching optics for each of its four channels. In FIG. 2, lightbox 10 includes master laser 12, preamplifier Mode-Matching Optics (MMO) 14, optical preamplifier 16, mirrors 18A-18F, power-amplifier mode-matching optics 20A-20D, beam splitters 22A-22C, and optical power amplifiers 24A-24D. Master laser (or seed laser) 12 is configured to generate a laser beam that seeds optical preamplifier 16. Such a configuration of using master laser 12 in conjunction with optical preamplifier 16 is called Master Oscillator Power Amplifier (MOPA).

Such a MOPA configuration can have various advantages over configurations using a single laser cavity to produce a laser beam with a required amount of power. This is because the MOPA configuration permits decoupling of various design specifications. As a result, it can be easier to reach the required performance (e.g., linewidth, wavelength tuning range, beam quality, pulse duration, power level, etc.) using a MOPA configuration. MOPA configurations also can present various design challenges, as well. For example, a MOPA configuration can be sensitive to back-reflections and can have higher levels of noise.

For best performance, good optical coupling efficiency between master laser 12 and optical preamplifier 16 should be obtained. To obtain such optical coupling efficiency, preamplifier mode-matching optics 14 are situated between master laser 12 and optical preamplifier 16. Preamplifier mode-matching optics 14 are configured to shape the optical beam presented to optical preamplifier 16 so as to increase or maximize coupling of such a shaped beam to optical preamplifier 16. Such beam shaping performed by the preamplifier mode-matching optics 14 is called mode-matching. If master laser 12 is a laser diode, then the laser beam generated thereby can have divergences that are different for each of the two quadrature directions orthogonal to a direction in which the beam propagates. To mode-match such a laser beam preamplifier mode-matching optics can include several cylindrical lenses, which are oriented to independently shape the beam in each of two quadrature directions orthogonal to a direction in which the beam propagates.

Optical preamplifier 16 is configured to amplify the optical beam shaped by preamplifier mode-matching optics 14 and to output the amplified beam. The amplified beam is then directed via mirror 18A toward the four channels of lightbox 10. The amplified beam is then received by power-amplifier Mode-Matching Optics (MMO) 20A, which is configured to shape the amplified beam so as to obtain good coupling efficiency with optical power amplifier 24A. Thus, the optical beam has now been doubly reshaped (i.e., first by preamplifier MMO 14, then by power-amplifier MMO 20A). Beam splitter 22A splits a beam-split portion of the now doubly-reshaped beam (e.g., 25% of the shaped beam) and directs the beam-split portion of the doubly-reshaped beam toward mirror 18B. Mirror 18B directs the beam-split portion of the doubly-reshaped beam to optical power amplifier 24A. Optical power amplifier 24A then amplifies and outputs beam-split portion of the doubly-reshaped beam, which is ultimately directed into the atmosphere in a first direction.

Beam splitter 22A, which directed the beam-split portion of the doubly-reshaped beam into the first channel, also directs the remainder of the doubly-reshaped beam to power-amplifier mode-matching optics 20B. Power-amplifier mode-matching optics 20B are configured to reshape the remainder of the doubly-reshaped beam so as to obtain good coupling efficiency with power amplifier 24B. Such reshaping of the remainder of the doubly-reshaped beam is needed because the optical path length between power-amplifier mode-matching optics 20A and optical power amplifier 24B is different from the optical path length between power-amplifier mode-matching optics 20A and optical power amplifier 24A. Thus, the optical beam has now been triply reshaped (i.e., first by preamplifier MMO 14, then by power-amplifier MMOs 20A and 20B). Beam splitter 22B splits a beam-split portion of now triply-reshaped beam (e.g., 33.3% of the triply-reshaped beam) and directs the beam-split portion of the triply-reshaped beam toward mirror 18C. Mirror 18C directs the beam-split portion of the triply-reshaped beam to optical power amplifier 24B. Optical power amplifier 24B then amplifies and outputs the beam-split portion of the triply-reshaped beam, which is ultimately directed into the atmosphere in a second direction.

Beam splitter 22B, which directed the beam-split portion of the triply-reshaped beam into the second channel, also directs the remainder of the triply-reshaped beam to power-amplifier mode-matching optics 20C. Power-amplifier mode-matching optics 20C are configured to reshape the remainder of the triply-reshaped beam so as to obtain good coupling efficiency with power amplifier 24C. Such reshaping of the remainder of the triply-reshaped beam is needed because the optical path length between power-amplifier mode-matching optics 20B and optical power amplifier 24C is different from the optical path length between power-amplifier mode-matching optics 20B and optical power amplifier 24B. Thus, the optical beam has now been quadruply reshaped (i.e., first by preamplifier MMO 14, then by power-amplifier MMOs 20A, 20B and 20C). Beam splitter 22C splits a beam-split portion of the quadruply-reshaped beam (e.g., 50% of the quadruply-reshaped beam) and directs the beam-split portion of the now quadruply-reshaped beam toward mirror 18D. Mirror 18D directs the beam-split portion of the quadruply-reshaped beam to optical power amplifier 24C. Optical power amplifier 24C then amplifies and outputs the beam-split portion of the quadruply-reshaped beam, which is ultimately directed into the atmosphere in a third direction.

Beam splitter 22C, which directed the split quadruply-reshaped beam of the amplified beam into the third channel, also directs the remainder of the quadruplyh-reshaped beam to power-amplifier mode-matching optics 20D. Power-amplifier mode-matching optics 20D are configured to reshape the remainder of the quadruply-reshaped beam so as to obtain good coupling efficiency with power amplifier 24D. Such reshaping of the remainder of the quadruply-reshaped beam is needed because the optical path length between power-amplifier mode-matching optics 20C and optical power amplifier 24D is different from the optical path length between power-amplifier mode-matching optics 20C and optical power amplifier 24C. Thus, the optical beam has now been quintuply reshaped (i.e., first by preamplifier MMO 14, then by power-amplifier MMOs 20A, 20B, 20C and 20D). Mirrors 18E and 18F direct the quintuply-reshaped beam to optical power amplifier 24D, which amplifies the quintuply-reshaped beam portion received thereby. Optical power amplifier 24D then outputs the amplified quintuply-reshaped beam, which is ultimately directed into the atmosphere in a fourth direction.

In the FIG. 2 embodiment, the amplified beam is shaped or reshaped five times—first by preamplifier mode-matching optics 14, and then sequentially by power-amplifier mode-matching optics 20A, 20B, 20C, and 20D. Each channel must be independently tuned, and each channel has components that are different from those of other channels (e.g., beam splitters 22A-22C, power-amplifier mode-matching optics 20A-20D, and/or optical power amplifiers 24A-24D). The reason that the beam must be shaped so many times in the FIG. 2 embodiment is because the optical path lengths to each of the optical power amplifiers are different for one another. When optical amplifiers 24A-24D are nearly identical, but the optical pathlengths to optical power amplifiers 14A-14D are different from one another, such multiplicity in reshaping provides the correct beam shape to each of optical power amplifiers 24A-24D.

Figure 3:
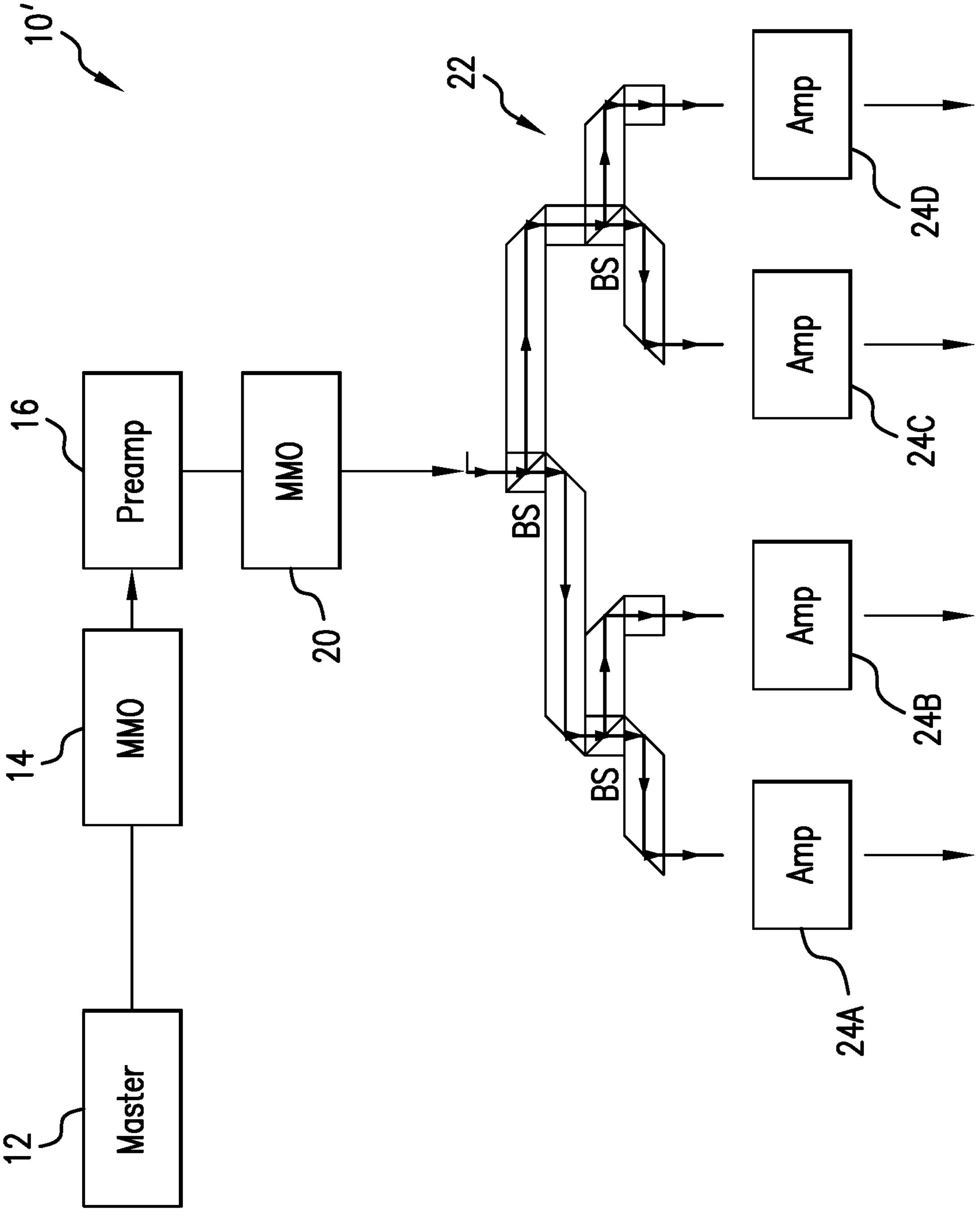
FIG. 3 is a schematic diagram of a laser air-data system's lightbox, which mode matches four optical beams to four optical power amplifiers using a single mode-matching optical system.

FIG. 3 is a schematic diagram of a laser air-data system's lightbox, which mode matches four optical beams to four optical power amplifiers using a single mode-matching optical system. In FIG. 3, lightbox 10' includes master laser 12, preamplifier mode-matching optics 14, optical preamplifier 16, power-amplifier mode-matching optics 20, 1×4 beam splitter 22, and optical power amplifiers 24A-24D. Master laser (or seed laser) 12 is again configured to generate a laser beam that seeds optical preamplifier 16. Preamplifier mode-matching optics 14 are again situated between master laser 12 and optical preamplifier 16. Preamplifier mode-matching optics 14 are configured to shape the optical beam presented to optical preamplifier 16 so as to increase or maximize coupling of such a shaped beam to optical preamplifier 16.

Optical preamplifier 16 is configured to amplify the optical beam shaped by preamplifier mode-matching optics 14 and to output the amplified beam. The amplified beam is then directed to power-amplifier mode-matching optics 20, which is configured to shape the amplified beam so as to obtain good coupling efficiency with each of optical power amplifiers 24A-24D. 1×4 beam splitter 22 splits the shaped beam into four beam-split portions and directs the four beam-split portions to optical power amplifiers 24A-24D, respectively. 1×4 beam splitter 22 is configured to split the shaped beam into the four beam-split portions in a manner in which the four beam-split portions are substantially equal in amplitude. Moreover, the four optical path lengths, which correspond to the four beam-split portions, through 1×4 beam splitter are configured to be substantially equal to one another, as will be described below with reference to FIG. 4. Such equal path lengths ensure that the beam shaping performed by power-amplifier mode-matching optics 20 will result in the four beam-split portions having substantially the same beam shape when emerging from 1×4 beam splitter 22.

Each of optical power amplifiers 24A-24D receives and amplifies a corresponding one of the four beam-split portions and then outputs the amplified beam-split portion, which is ultimately directed into the atmosphere in some direction. There are various ways of projecting the amplified beam-split portions into the atmosphere. For example, the amplified beam-split portions can be transmitted, via an optical fiber, to an optical projector. In some embodiments, the optical projector can include a collimating lens. Each channel can include an optical receiver configured to receive a backscattered portion of the beam-split portion projected into the atmosphere. The backscattered portion having been backscattered by the atmosphere (i.e., aerosols and/or air molecules in the atmosphere) contains information regarding the atmosphere. An air-data calculator can then calculate metrics of air data based on the plurality of received beam-split portions, as is known in the art.

Figure 4:
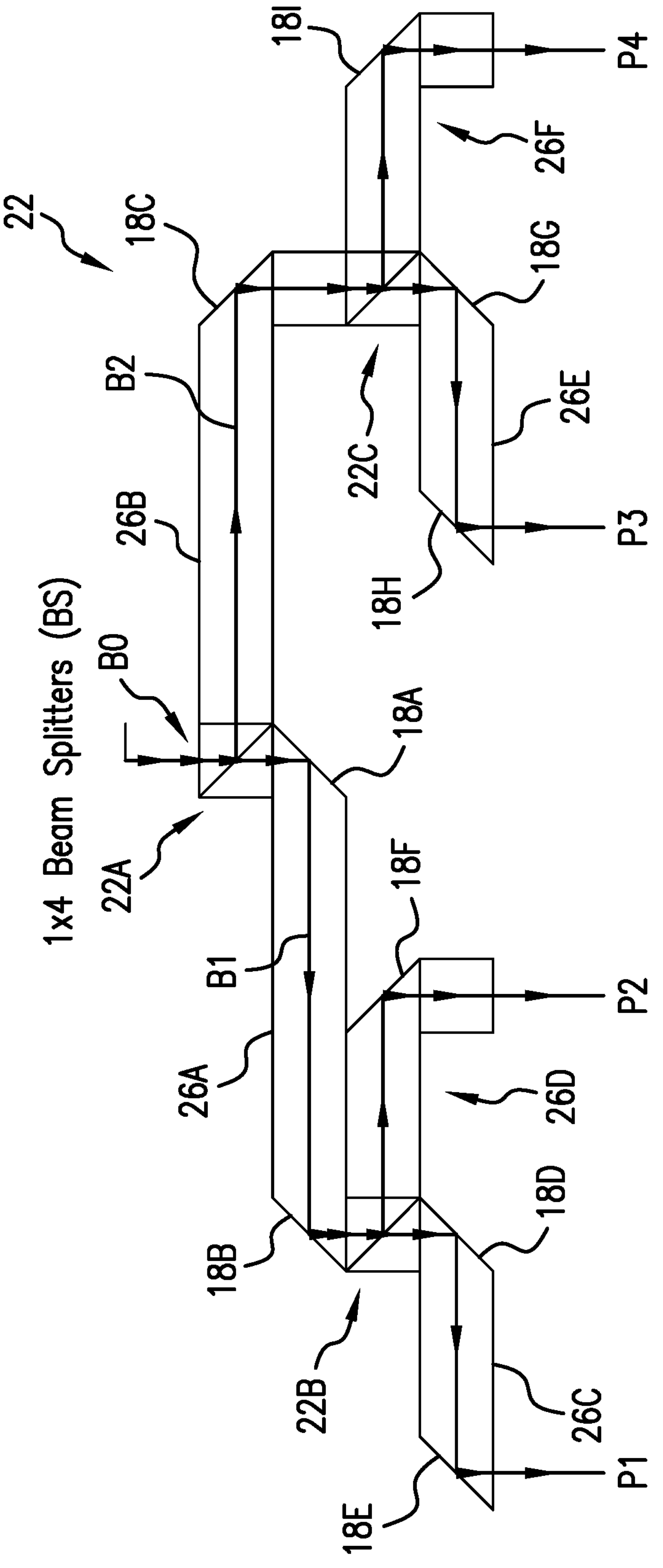
FIG. 4 is a plan view of a solid glass 1×4 beam-splitter/beam-guide element that ensures optical path lengths between mode-matching optics and a plurality of optical power amplifiers are substantially equal.

FIG. 4 is a plan view of a solid glass 1×4 beam-splitter/beam-guide element that ensures optical path lengths between mode-matching optics and a plurality of optical power amplifiers are substantially equal. In FIG. 4, 1×4 beam splitter 22 includes mirrors 18A-18I, beam splitters 22A-22C, and beam-guide prisms 26A-26F. Mirrors 18A-18I can be constructed in various manners. For example, a mirror coating can be deposited on faces of the beam-guide prisms. In embodiments in which the index n of refraction of the beam-guide prisms is sufficient (e.g., n=1.53), near total internal reflection occurs for angles of incidence of 45, and so no coatings are needed. A mode-matched optical beam B0, which has been shaped by power-amplifier mode-matching optics 20, is then directed to and received by beam splitter 22A, which splits the mode-matched optical beam received into first and second intermediate beams B1 and B2.

First and second intermediate beams B1 and B2 substantially equal in amplitude to one another. First intermediate beam B1 is directed to and received by beam-guide prism 26A. Beam-guide prism 26A is configured to guide first intermediate beam B1 from beam splitter 22A to beam splitter 22B. Beam-guide prism 26A guides first intermediate beam B1 using mirrors 18A and 18B on faces located on opposite ends of beam-guide prism 26A. Second intermediate beam B2 is directed to and received by beam-guide prism 26B. Beam-guide prism 26B is configured to guide second intermediate beam B2 from beam splitter 22A to beam splitter 22C. Beam-guide prism 26B guides second intermediate beam B1 using mirror 18C on a face of beam-guide prism 26B. In the FIG. 4 depiction, beam-guide prism 26B is formed of two pieces of optically transparent material (typically glass). Beam-guide prisms 26A and 26B can be designed such that optical path lengths traversed therewithin by first and second intermediate beams B1 and B2, respectively, are substantially equal to one another. Such equal path lengths are not strictly required as long as the total path lengths traveled all the way to the optical power amplifiers are substantially equal to one another.

Beam splitter 22B splits first intermediate beam B1 into first and second beam-split portions P1 and P2. First beam-split portion P1 is directed to and received by beam-guide prism 26C. Beam-guide prism 26C is configured to guide first beam-split portion P1 from beam splitter 22B to optical power amplifier 24A (depicted in FIG. 3), which is configured to receive first beam-split portion P1. Beam-guide prism 26C guides first beam-split portion P1 using mirrors 18D and 18E on faces located on opposite ends of beam-guide prism 26C. Second beam-split portion P2 is directed to and received by beam-guide prism 26D. Beam-guide prism 26D is configured to guide second beam-split portion P2 from beam splitter 22B to optical power amplifier 24B (depicted in FIG. 3), which is configured to receive second beam-split portion P2. Beam-guide prism 26D guides second beam-split portion P2 using mirror 18F on a face of beam-guide prism 26D. In the FIG. 4 depiction, beam-guide prism 26D is formed of two pieces of optically transparent material (typically glass). Beam-guide prisms 26C and 26D can be designed such that optical path lengths traversed therewithin by first and second beam-split portions P1 and P2, respectively, are substantially equal to one another.

Beam splitter 22C splits second intermediate beam B2 into third and fourth beam-split portions P3 and P4. Third beam-split portion P3 is directed to and received by beam-guide prism 26E. Beam-guide prism 26E is configured to guide third beam-split portion P3 from beam splitter 22C to optical power amplifier 24C (depicted in FIG. 3), which is configured to receive third beam-split portion P3. Beam-guide prism 26E guides third beam-split portion P3 using mirrors 18G and 18H on faces located on opposite ends of beam-guide prism 26E. Fourth beam-split portion P4 is directed to and received by beam-guide prism 26F. Beam-guide prism 26F is configured to guide fourth beam-split portion P4 from beam splitter 22C to optical power amplifier 24D (depicted in FIG. 3), which is configured to receive fourth beam-split portion P4. Beam-guide prism 26F guides fourth beam-split portion P4 using mirror 18I on a face of beam-guide prism 26F. In the FIG. 4 depiction, beam-guide prism 26D is formed of two pieces of optically transparent material (typically glass). Beam-guide prisms 26E and 26F can be designed such that optical path lengths traversed therewithin by third and fourth beam-split portions P3 and P4, respectively, are substantially equal to one another.

Beam splitters 22A-22C and beam-guide prisms 26A-26F can be manufactured using optical materials that have the same index of refraction such that little or no internal reflections arise at the interfaces between beam-guide prisms 26A-26F and beam splitters 22A-22C. Typically, optical quality glasses are used for such construction of 1×4 beam splitter 22. Such a design results in an all-glass construction (using the same index of glass) of 1×4 beam splitter 22. In some embodiments, beam splitters 22A-22C are constructed using first and second right-triangular isosceles prisms sandwiching a beam-splitting layer between hypotenuse faces of the first and second right-triangular isosceles prisms. The first and second triangular isosceles prisms can be made using the same type and grade of glass as is used for beam-guide prisms 26A-26F.

DISCUSSION OF POSSIBLE EMBODIMENTS

The following are non-exclusive descriptions of possible embodiments of the present invention.

Apparatus and associated methods relate to a system for measuring metrics of an atmosphere. The system includes a laser configured to generate a laser beam. The system includes mode-matching optics configured to receive the laser beam generated by the laser and to generate a mode-matched optical beam therefrom. The system includes a plurality of beam splitters configured to split the mode-matched optical beam into a plurality of beam-split portions, each substantially equal in amplitude with others of the plurality of beam-split portions. The system includes a plurality of optical power amplifiers, each configured to receive and amplify a corresponding one of the plurality of beam-split portions, thereby generating a corresponding one of the plurality of amplified beams. Optical path lengths between the mode-matching optics and the plurality of optical power amplifiers are substantially equal to one another, thereby enabling optical mode matching of the mode-matched optical beam to each of the plurality of optical power amplifiers. The system includes a plurality of optical projectors configured to project a plurality of projected beams into an atmosphere. Each of the plurality of optical projectors is configured to project a corresponding one of the plurality of amplified beams thereby projecting a corresponding one of the plurality of projected beams. The system includes a plurality of optical receivers configured to receive a plurality of received beam-split portions of the plurality of projected beams backscattered by the atmosphere. Each of the plurality of optical receivers is aligned so as to receive a corresponding one of the plurality of received beam-split portions of the plurality of projected beams backscattered by the atmosphere. The system also includes an air-data calculator configured to calculate metrics of air data based on the plurality of received beam-split portions.

Some embodiments relate to a system for optical mode matching a plurality of optical beams to a corresponding plurality of optical power amplifiers. The system includes a laser configured to generate a laser beam. The system includes mode-matching optics configured to receive the laser beam generated by the laser and to generate a mode-matched optical beam therefrom. The system includes a plurality of beam splitters configured to split the mode-matched optical beam into a plurality of beam-split portions, each substantially equal in amplitude with others of the plurality of beam-split portions. The system includes a plurality of optical power amplifiers, each configured to receive and amplify a corresponding one of the plurality of beam-split portions, thereby generating a corresponding one of the plurality of amplified beams. Optical path lengths between the mode-matching optics and the plurality of optical power amplifiers are substantially equal to one another, thereby enabling optical mode matching of the mode-matched optical beam to each of the plurality of optical power amplifiers.

The system of the preceding paragraph can optionally include, additionally and/or alternatively, any one or more of the following features, configurations and/or additional components:

A further embodiment of the foregoing system, wherein each of the plurality of beam-split portions of the mode-matched optical beams can have an amplitude that is substantially equal in amplitude with others of the plurality of beam-split portions of the mode-matched optical beams.

A further embodiment of any of the foregoing systems, wherein each of the plurality of beam splitters can include first and second right-triangular isosceles prisms sandwiching a beam-splitting layer between hypotenuse faces of the first and second right-triangular isosceles prisms.

A further embodiment of any of the foregoing systems, wherein the plurality of beam-split portions of the mode-matched optical beam can include first, second, third, and fourth beam-split portions of the mode-matched optical beam.

A further embodiment of any of the foregoing systems, wherein the plurality of beam splitters can include: a first beam splitter configured to receive the mode-matched optical beam and to split the mode-match optical beam into first and second intermediate beams that are substantially equal in amplitude with one another; a second optical splitter configured to receive the first intermediate beam and to split the first intermediate beam into the first and second beam-split portions that are substantially equal in amplitude with one another; and a third optical splitter configured to receive the second intermediate beam and to split the second intermediate beam into the third and fourth beam-split portions that are substantially equal in amplitude with one another.

A further embodiment of any of the foregoing systems can further include first and second beam-guide prisms configured to guide the first and second intermediate beams from the first beam splitter to the second and third beam splitters respectively.

A further embodiment of any of the foregoing systems, wherein the first and second beam-guide prisms can have indices of refraction that is substantially equal to indices of refraction of the first and second right-triangular isosceles prisms of each of the first, second, and third beam splitters.

A further embodiment of any of the foregoing systems, wherein the plurality of optical power amplifiers can include first, second, third, and fourth optical power amplifiers configured to receive and amplify the first, second, third, and fourth beam-split portions of the mode-matched optical beam, respectively.

A further embodiment of any of the foregoing systems can further include: third and fourth beam-guide prisms configured to guide the first and second beam-split portions from the second beam splitter to the first and second optical power amplifiers; and fifth and sixth beam-guide prisms configured to guide the third and fourth beam-split portions from the third beam splitter to the third and fourth optical power amplifiers.

A further embodiment of any of the foregoing systems, wherein the third, fourth, fifth and sixth beam-guide prisms can have indices of refraction that is substantially equal to indices of refraction of the first and second right-triangular isosceles prisms of each of the first, second, and third beam splitters.

A further embodiment of any of the foregoing systems, wherein the index of refraction can be substantially constant throughout the optical paths from the first beam splitter to the first, second, third, and fourth optical power amplifiers.

Some embodiments relate to a method for optical mode matching a plurality of optical beams to a corresponding plurality of optical power amplifiers. The system includes generating, via a laser, a laser beam. The method includes generating, via mode-matching optics, a mode-matched optical beam from the laser beam. The method includes splitting, via a plurality of beam splitters, the mode-matched optical beam into a plurality of beam-split portions. The method includes amplifying, via each of a plurality of optical power amplifiers, a corresponding one of the plurality of beam-split portions of the mode-matched optical beam. The method also includes configuring the plurality of splitters and the plurality of optical power amplifiers so as to make substantially equal to one another optical path lengths between the mode-matching optics and the plurality of optical power amplifiers, thereby enabling optical mode matching of the mode-matched optical beam to each of the plurality of optical power amplifiers.

The method of the preceding paragraph can optionally include, additionally and/or alternatively, any one or more of the following features, configurations and/or additional components:

A further embodiment of the foregoing method, wherein splitting the mode-matched optical beam into a plurality of beam-split portions can be done in such manner as to make amplitudes of the plurality of beam-split portions substantially equal to one another.

A further embodiment of any of the foregoing methods, wherein splitting the mode-matched optical beam can include splitting, via first, second, and third beam splitters, the mode-matched optical beam into first, second, third, and fourth beam-split portions.

A further embodiment of any of the foregoing methods, wherein splitting the mode-matched optical beam can include: splitting, via a first beam splitter, the mode-matched optical beam into first and second intermediate beams that are substantially equal in amplitude with one another; splitting, via a second optical splitter, the first intermediate beam into the first and second beam-split portions that are substantially equal in amplitude with one another; and splitting, via a third optical splitter, the second intermediate beam into the third and fourth beam-split portions that are substantially equal in amplitude with one another.

A further embodiment of any of the foregoing methods can further include guiding, via first and second beam-guide prisms, the first and second intermediate beams from the first beam splitter to the second and third beam splitters respectively.

A further embodiment of any of the foregoing methods, wherein the first and second beam-guide prisms can have indices of refraction that is substantially equal to indices of refraction of the first and second right-triangular isosceles prisms of each of the first, second, and third beam splitters.

A further embodiment of any of the foregoing methods, wherein the plurality of optical power amplifiers can include amplifying, via first, second, third, and fourth optical power amplifiers, the first, second, third, and fourth beam-split portions of the mode-matched optical beam, respectively.

A further embodiment of any of the foregoing methods can further include: guiding, via third and fourth beam-guide prisms, the first and second beam-split portions from the second beam splitter to the first and second optical power amplifiers; and guiding, via fifth and sixth beam-guide prisms, the third and fourth beam-split portions from the third beam splitter to the third and fourth optical power amplifiers It will be recognized that the invention is not limited to the implementations so described but can be practiced with modification and alteration without departing from the scope of the appended claims. For example, the above implementations may include specific combinations of features. However, the above implementations are not limited in this regard, and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A system for measuring metrics of an atmosphere, the system including:

a laser configured to generate a laser beam;

mode-matching optics configured to receive the laser beam generated by the laser and to generate a mode-matched optical beam therefrom;

a plurality of beam splitters configured to split the mode-matched optical beam into a plurality of beam-split portions, wherein each of the plurality of beam splitters includes:

first and second right-triangular isosceles prisms sandwiching a beam-splitting layer between hypotenuse faces of the first and second right-triangular isosceles prisms, wherein each of the plurality of beam-split portions of the mode-matched optical beams has an amplitude that is substantially equal in amplitude with others of the plurality of beam-split portions of the mode-matched optical beams; and a plurality of optical power amplifiers, each configured to receive and amplify a corresponding one of the plurality of beam-split portions of the mode-matched optical beam, optical path lengths between the mode-matching optics and the plurality of optical power amplifiers being substantially equal to one another thereby enabling optical mode matching of the mode-matched optical beam to each of the plurality of optical power amplifiers;

a plurality of optical projectors configured to project a plurality of projected beams into an atmosphere, each of the plurality of optical projectors configured to project a corresponding one of the plurality of amplified beams thereby projecting a corresponding one of the plurality of projected beams;

a plurality of optical receivers configured to receive a plurality of received beam-split portions of the plurality of projected beams backscattered by the atmosphere, each of the plurality of optical receivers aligned so as to receive a corresponding one of the plurality of received beam-split portions of the plurality of projected beams backscattered by the atmosphere; and an air-data calculator configured to calculate metrics of air data based on the plurality of received beam-split portions.

2. A system for optical mode matching a plurality of optical beams to a corresponding plurality of optical power amplifiers, the system including:

a laser configured to generate a laser beam;

mode-matching optics configured to receive the laser beam generated by the laser and to generate a mode-matched optical beam therefrom;

a plurality of beam splitters configured to split the mode-matched optical beam into a plurality of beam-split portions, wherein each of the plurality of beam splitters includes:

first and second right-triangular isosceles prisms sandwiching a beam-splitting layer between hypotenuse faces of the first and second right-triangular isosceles prisms, wherein each of the plurality of beam-split portions of the mode-matched optical beams has an amplitude that is substantially equal in amplitude with others of the plurality of beam-split portions of the mode-matched optical beams; and a plurality of optical power amplifiers, each configured to receive and amplify a corresponding one of the plurality of beam-split portions of the mode-matched optical beam, optical path lengths between the mode-matching optics and the plurality of optical power amplifiers being substantially equal to one another thereby enabling optical mode matching of the mode-matched optical beam to each of the plurality of optical power amplifiers.

3. The system of claim 2, wherein the plurality of beam-split portions of the mode-matched optical beam includes first, second, third, and fourth beam-split portions of the mode-matched optical beam.

4. The system of claim 3, wherein the plurality of beam splitters includes:

a first beam splitter configured to receive the mode-matched optical beam and to split the mode-match optical beam into first and second intermediate beams that are substantially equal in amplitude with one another;

a second optical splitter configured to receive the first intermediate beam and to split the first intermediate beam into the first and second beam-split portions that are substantially equal in amplitude with one another; and a third optical splitter configured to receive the second intermediate beam and to split the second intermediate beam into the third and fourth beam-split portions that are substantially equal in amplitude with one another.

5. The system of claim 4, further comprising:

first and second beam-guide prisms configured to guide the first and second intermediate beams from the first beam splitter to the second and third beam splitters respectively.

6. The system of claim 5, wherein the first and second beam-guide prisms have indices of refraction that is substantially equal to indices of refraction of the first and second right-triangular isosceles prisms of each of the first, second, and third beam splitters.

7. The system of claim 6, wherein the plurality of optical power amplifiers includes:

first, second, third, and fourth optical power amplifiers configured to receive and amplify the first, second, third, and fourth beam-split portions of the mode-matched optical beam, respectively.

8. The system of claim 7, further comprising:

third and fourth beam-guide prisms configured to guide the first and second beam-split portions from the second beam splitter to the first and second optical power amplifiers; and fifth and sixth beam-guide prisms configured to guide the third and fourth beam-split portions from the third beam splitter to the third and fourth optical power amplifiers.

9. The system of claim 8, wherein the third, fourth, fifth and sixth beam-guide prisms have indices of refraction that is substantially equal to indices of refraction of the first and second right-triangular isosceles prisms of each of the first, second, and third beam splitters.

10. The system of claim 9, wherein the index of refraction is substantially constant throughout the optical paths from the first beam splitter to the first, second, third, and fourth optical power amplifiers.

11. A method for optical mode matching a plurality of optical beams to a corresponding plurality of optical power amplifiers, the system including:

generating, via a laser, a laser beam;

generating, via mode-matching optics, a mode-matched optical beam from the laser beam;

splitting, via a plurality of beam splitters, the mode-matched optical beam into a plurality of beam-split portions, wherein splitting the mode-matched optical beam includes:

splitting, via first, second, and third beam splitters, the mode-matched optical beam into first, second, third, and fourth beam-split portions, wherein splitting the mode-matched optical beam into a plurality of beam-split portions is done in such manner as to make amplitudes of the plurality of beam-split portions substantially equal to one another, wherein splitting the mode-matched optical beam includes:

splitting, via a first beam splitter, the mode-matched optical beam into first and second intermediate beams that are substantially equal in amplitude with one another;

splitting, via a second optical splitter, the first intermediate beam into the first and second beam-split portions that are substantially equal in amplitude with one another; and splitting, via a third optical splitter, the second intermediate beam into the third and fourth beam-split portions that are substantially equal in amplitude with one another;

guiding, via first and second beam-guide prisms, the first and second intermediate beams from the first beam splitter to the second and third beam splitters respectively;

amplifying, via each of a plurality of optical power amplifiers, a corresponding one of the plurality of beam-split portions of the mode-matched optical beam; and configuring the plurality of splitters and the plurality of optical power amplifiers so as to make substantially equal to one another optical path lengths between the mode-matching optics and the plurality of optical power amplifiers, thereby enabling optical mode matching of the mode-matched optical beam to each of the plurality of optical power amplifiers.

12. The method of claim 11, wherein the first and second beam-guide prisms have indices of refraction that is substantially equal to indices of refraction of the first and second right-triangular isosceles prisms of each of the first, second, and third beam splitters.

13. The method of claim 12, wherein the plurality of optical power amplifiers includes:

amplifying, via first, second, third, and fourth optical power amplifiers, the first, second, third, and fourth beam-split portions of the mode-matched optical beam, respectively.

14. The method of claim 13, further comprising:

guiding, via third and fourth beam-guide prisms, the first and second beam-split portions from the second beam splitter to the first and second optical power amplifiers; and guiding, via fifth and sixth beam-guide prisms, the third and fourth beam-split portions from the third beam splitter to the third and fourth optical power amplifiers.

* * * * *